(12) United States Patent
Fukui

(10) Patent No.: US 12,485,375 B2
(45) Date of Patent: Dec. 2, 2025

(54) OIL SEPARATOR

(71) Applicant: FUKUHARA Co., Ltd., Yokohama (JP)

(72) Inventor: Hiroyuki Fukui, Yokohama (JP)

(73) Assignee: FUKUHARA Co., Ltd., Yokohama (JP)

( * ) Notice: Subject to any disclaimer, the term of this patent is extended or adjusted under 35 U.S.C. 154(b) by 0 days.

(21) Appl. No.: 18/041,213

(22) PCT Filed: Oct. 24, 2022

(86) PCT No.: PCT/JP2022/039507
§ 371 (c)(1),
(2) Date: Feb. 9, 2023

(87) PCT Pub. No.: WO2023/105956
PCT Pub. Date: Jun. 15, 2023

(65) Prior Publication Data
US 2024/0042365 A1     Feb. 8, 2024

(30) Foreign Application Priority Data

Dec. 8, 2021 (JP) .................................. 2021-199276

(51) Int. Cl.
*B01D 46/00* (2022.01)

(52) U.S. Cl.
CPC ..... *B01D 46/0086* (2013.01); *B01D 46/0036* (2013.01)

(58) Field of Classification Search
CPC ............ B01D 46/0086; B01D 46/0036; B01D 46/003; G01B 21/783; G01B 33/28
See application file for complete search history.

(56) References Cited

U.S. PATENT DOCUMENTS 4,459,266 A * 7/1984 Lamoreaux .......... G01N 31/223
128/204.22
5,538,690 A * 7/1996 Greer ................... G01N 21/783
73/31.03

(Continued)

FOREIGN PATENT DOCUMENTS

JP      H03267105 A  * 11/1991
JP      2006297363 A * 11/2006

(Continued)

OTHER PUBLICATIONS

Translation of JP-2006297363-A, accessed May 5, 2025 (Year: 2006).*

(Continued)

*Primary Examiner* — Jennifer Dieterle
*Assistant Examiner* — Phillip Y Shao
(74) *Attorney, Agent, or Firm* — Muncy, Geissler, Olds & Lowe, P.C.

(57) ABSTRACT

An oil separator 10 includes: a case 11 having an inlet 12 and outlet 13; and an oil removal member 30 which is installed in the case 11 and separates and removes oil from passing compressed air. The compressed air flowing from the inlet 12 into the case 11 passes through the oil removal member 30 and flows out from the outlet 13. The oil separator 10 is configured to have an oil detector 20 that provides instructions in accordance with an amount of oil included in the compressed air passing through the oil removal member 30.

9 Claims, 5 Drawing Sheets

(56) References Cited

U.S. PATENT DOCUMENTS

| | | | |
|---|---|---|---|
| 2002/0100311 A1* | 8/2002 | Eddy, Jr. ............... | B60T 17/002 73/1.01 |
| 2004/0149912 A1* | 8/2004 | Nomura ............. | G01N 21/3504 250/339.13 |
| 2016/0339377 A1* | 11/2016 | Arakawa .............. | B01D 46/521 |

FOREIGN PATENT DOCUMENTS

| | | |
|---|---|---|
| JP | 2015-20112 A | 2/2015 |
| JP | 6389992 B1 | 9/2018 |

OTHER PUBLICATIONS

Translation of JP-2015020112-A, accessed May 5, 2025 (Year: 2015).*
Translation of JPH03267105A, accessed May 5, 2025 (Year: 1991).*

\* cited by examiner

OIL SEPARATOR

TECHNICAL FIELD

The present invention relates to an oil separator that separates and removes oil from compressed air.

BACKGROUND ART

A compressed air circuit, to which pneumatic devices such as an air gun and an air cylinder are connected, is provided with an oil separator for separating and removing oil components from a compressed air flowing in the circuit (for example, patent document 1). With the compressed air circuit provided with such an oil separator, clean compressed air, from which oil components are removed, can be supplied to the pneumatic devices, so the pneumatic devices can be operated normally for a long period of time.

This type of oil separator, disposed in the compressed air circuit, is structured such that an oil removal member (for example, oil adsorption member) for separating and removing oil from the compressed air is filled in a case (hollow tube) provided with an inlet and an outlet (exhaust port). The oil in the compressed air flowing into the case from the inlet is removed by the oil removal member, and the compressed air, from which the oil has been removed, flows out from the outlet.

PRIOR ART DOCUMENT

Patent Literature

Patent document 1: Japanese Patent Application Publication 2015-20112

SUMMARY OF INVENTION

Technical Problem

Unfortunately, with the oil separator having the above mentioned structure, oil removal member, for example oil removal performance of adsorbent (adsorption performance) lowers over time. Because of this, the adsorption member has to be replaced with adequate timing. In the conventional oil separators, regardless of the actual oil removal performance of the adsorption member, the adsorption member is replaced at predetermined intervals.

However, the oil removal performance of the adsorption member installed in the oil separator varies depending on the situation how the compressed air passes through the oil separator or depending on a quantity of the oil in the compressed air, based on the use condition of the pneumatic device connected to the compressed air circuit, in which the oil separator is disposed. For this reason, in the case where the adsorption member is simply replaced at predetermined intervals, the adsorption member could continuingly be used without sufficient oil removal, or the adsorption member could be replaced while its oil removal performance is still permissible. As such, replacement of the adsorption member is not necessarily be performed in the proper manner.

The present invention has been made with consideration of such circumstances, and provides an oil separator, which allows the oil removal member to be replaced at a suitable timing.

Solution to Problem

An oil separator according to the present invention is an oil separator comprising: a case having an inlet and outlet; and an oil removal member, which is installed in the case, and separates and removes oil from the passing compressed air; the oil separator being configured such that the compressed air flowing from the inlet into the case passes through the oil removal member and flows out from the outlet, wherein the oil separator further comprising: a pipe extending in such a way that a tip of the pipe is located inside the oil removal member in the case; an elongated-shaped detection pipe providing instructions in accordance with the quantity of the oil included in the passing compressed air; and a holding member which is formed with a channel, fixed to the case such that the pipe and channel are communicated with each other, and detachably holds said detection pipe such that the compressed air passing through the pipe and channel is introduced from the oil removal member to the detection pipe.

According to this structure, in the situation where the oil separator is used such that the compressed air flowing from the inlet into the case passes through the oil removal member and flows out of the outlet, part of the compressed air flowing in the oil removal member in the case is introduced to the pipe, and the compressed air introduced in said pipe passes through the channel of the holding member and is introduced into the detection pipe held by said holding member. When the compressed air introduced into the detection pipe passes through the detection pipe, the detection pipe provides instructions in accordance with the quantity of the oil included in the compressed air passing through the detection pipe. Oil removal performance of the oil removal member can be determined in response to the instructions from the detection pipe. Specifically, a degree of reduction in oil removal performance of the oil removal member is determined to be relatively large, from the instructions from the detection pipe in response to a relatively large amount of oil included in the compressed air. On the other hand, a degree of reduction in oil removal performance of the oil removal member is determined to be relatively small from the instructions from the detection pipe in response to a relatively small amount of oil included in the compressed air.

In the oil separator according to the present invention, the holding member may be constituted to have a valve mechanism for perform opening or closing of the channel.

In the state where the channel of the holding member is closed by the valve mechanism, the detection pipe can be held (exchanged) by the holding member. After the detection pipe is held (exchanged) by the holding member and when the channel of the holding member is opened by the valve mechanism, the detection pipe can provide instructions in accordance with the amount of the oil included in the passing compressed air.

In the oil separator according to the present invention, the holding member may be constituted to have, a detection pipe holder detachably holding one end of the detection pipe, and a coupling block that couples the detection pipe holder and the pipe.

According to this structure, in the state where one end of the elongated-shaped detection pipe is held by the detection pipe holder, the compressed air from the oil removal member introduced in the pipe passes through the channel of the coupling block and is introduced into the detection pipe held by the detection pipe holder.

In the oil separator according to the present invention, the oil detector is detachably connected to the detection pipe holder at one end portion, a through hole is created in another end portion, and the oil detector has a detection pipe cover that covers the detection pipe in the state where the detection pipe can be seen from the outside.

According to this structure, the detection pipe, one end of which is held by the detection pipe holder, may be protected by the detection pipe cover in the state where the detection pipe can be seen from the outside. A compressed air flow may be formed, which passes through the detection pipe covered with the detection pipe cover and escapes outside via the through hole of said detection pipe cover. The detection pipe held by the detection pipe holder can be exchanged by detaching the detection pipe cover from the detection pipe holder.

In the oil separator according to the present invention, it can be configured such that the outlet is located above the inlet in the height direction of the case, the pipe extends in the height direction of the case, and a tip of said pipe is located between the inlet and outlet in the height direction of the case.

According to this structure, part of the compressed air is introduced in the pipe, the compressed air flowing from the inlet into the case and advancing inside the oil removal member toward the outlet above the inlet, the compressed air introduced in the pipe and advancing further upward passes through the channel of the holding member and is introduced into the detection pipe held by said holding member.

In the oil separator according to the present invention, it may be configured that the outlet is provided at the upper end part of the case.

According to this structure, part of the compressed air is introduced in the pipe, the compressed air flowing from the inlet into the case and advancing inside the oil removal member toward the outlet provided at the upper end part of said case.

In the oil separator according to the present invention, it may be configured that the inlet is provided at the lower end part of the case.

According to this structure, part of the compressed air is introduced in the pipe, the compressed air flowing from the inlet provided at the lower end part of the case into said case and advancing inside the oil removal member toward the outlet above.

Advantageous Effects of Invention

According to the oil separator of the present invention, oil removal performance of the oil removal member can be determined in response to the instruction from the detection pipe, the oil removal member thus can be replaced at a suitable timing.

DESCRIPTION OF EMBODIMENTS

Hereinafter, the embodiments of the present invention will be explained with reference to the drawings.

Figure 1:
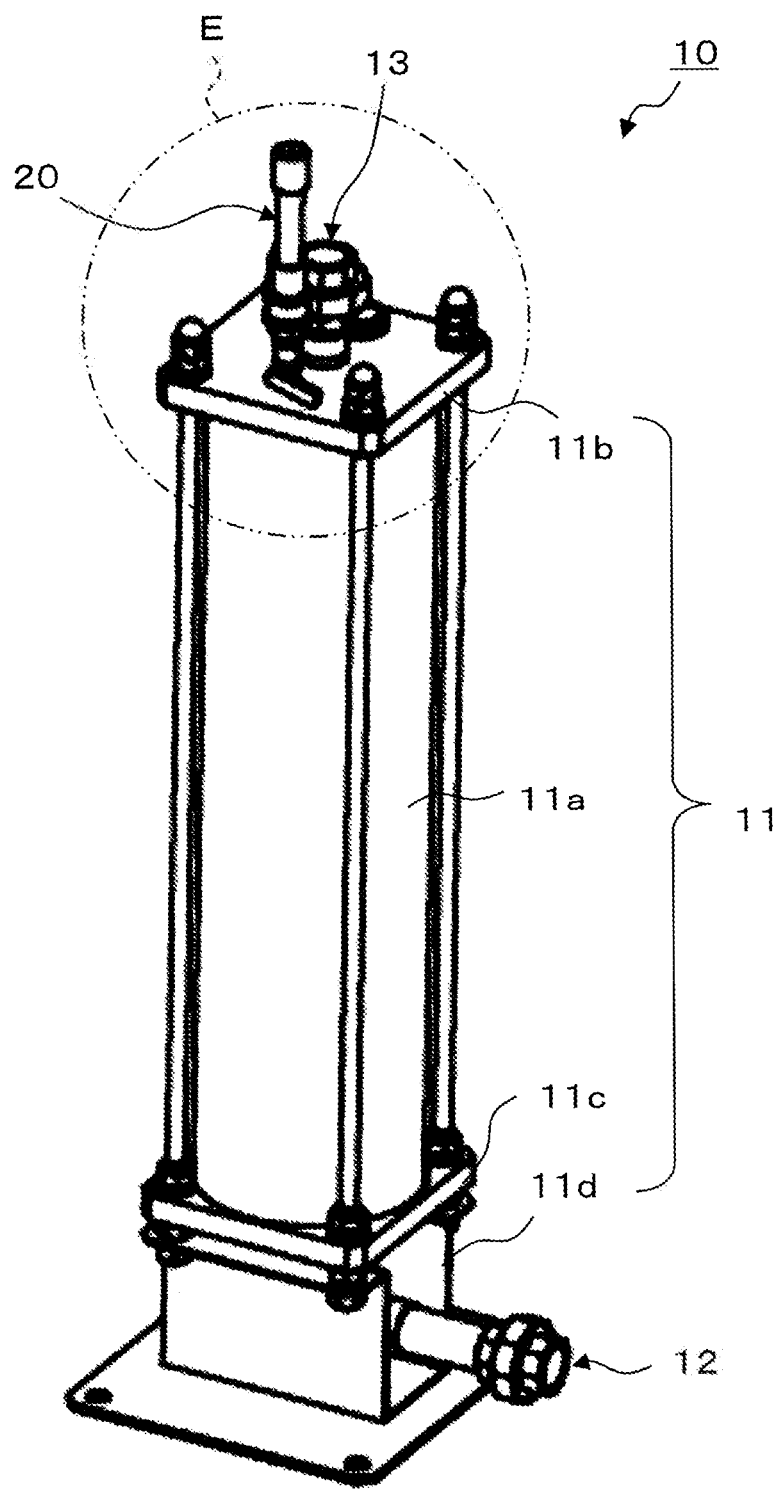
FIG. 1 is a perspective view showing an appearance of an oil separator according to an embodiment of the present invention.
Figure 2:
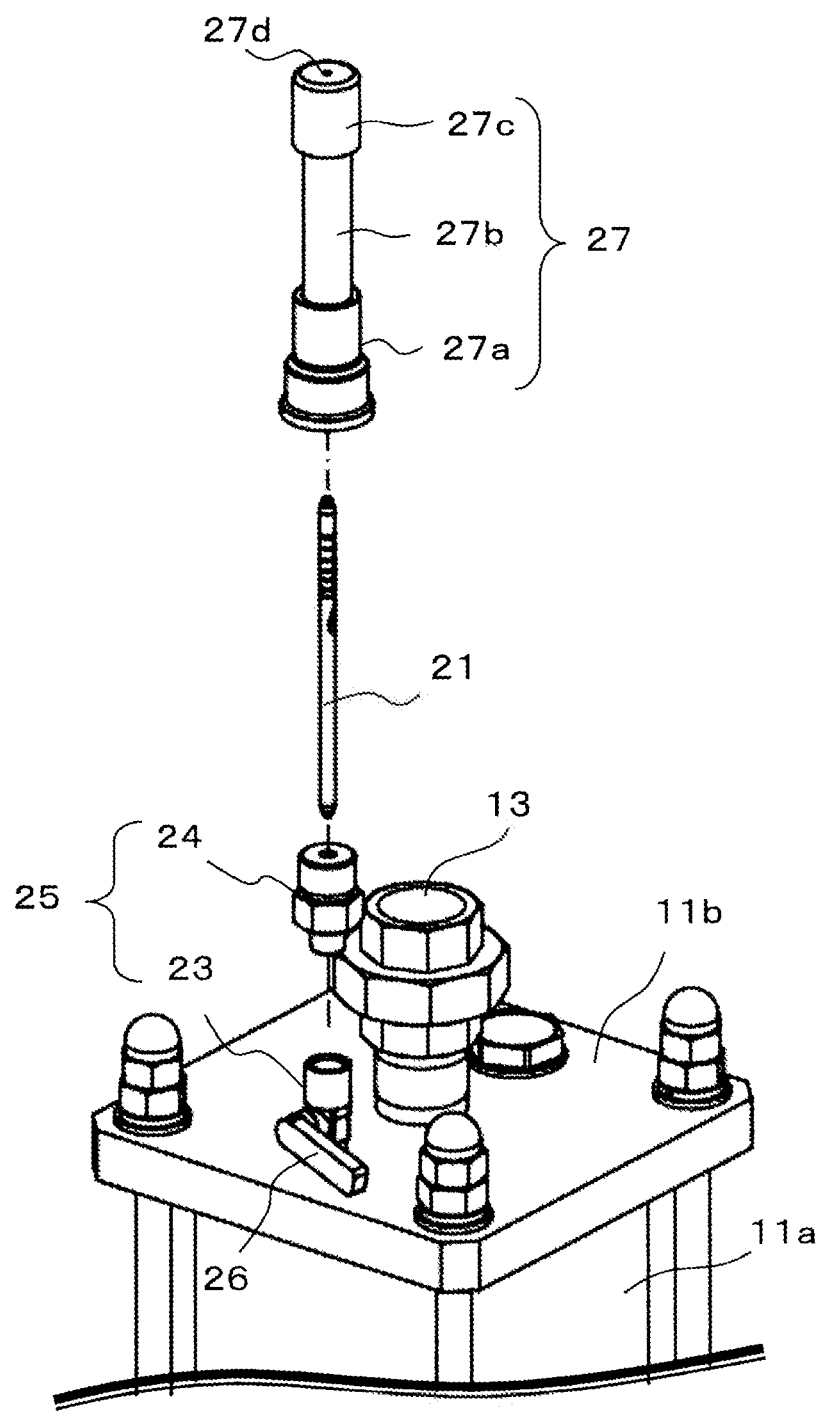
FIG. 2 is a perspective view of an area E in FIG. 1, enlarged and partially exploded.
Figure 3:
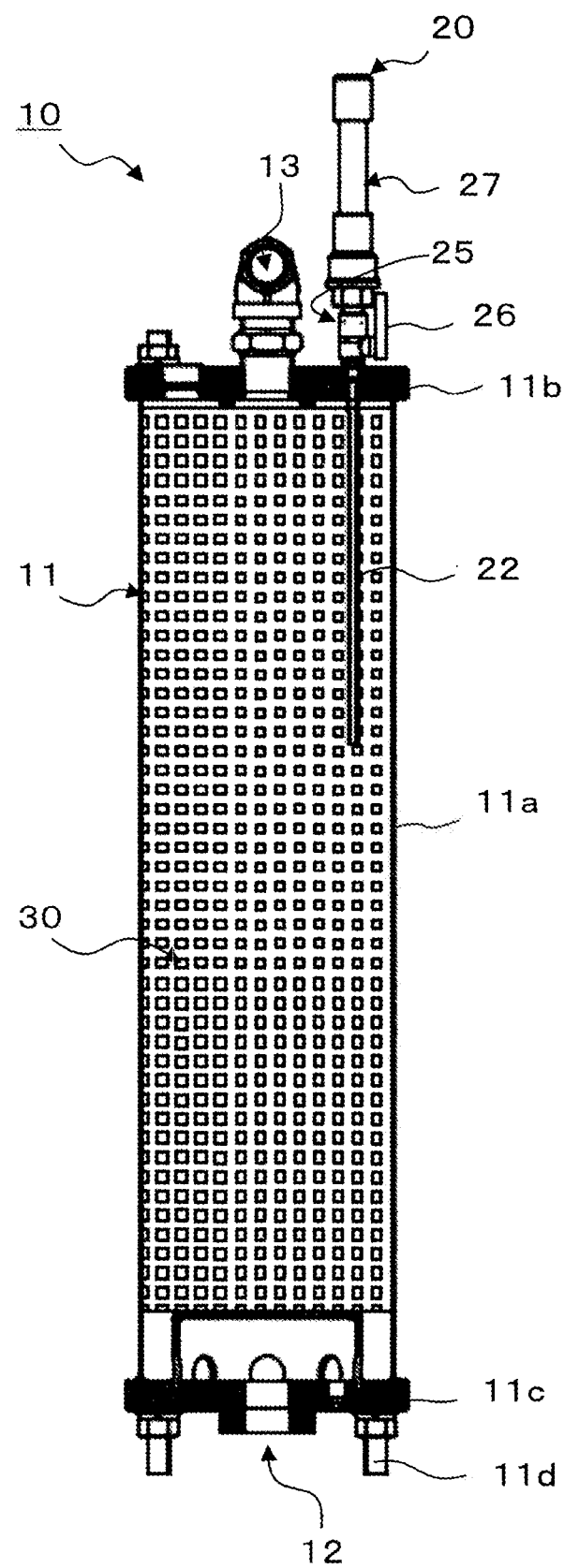
FIG. 3 is a cross-sectional view showing an oil separator according to an embodiment of the present invention.

The oil separator according to one aspect of the present invention is constituted as shown in FIG. 1 to FIG. 3. FIG. 1 is a perspective view showing the appearance of the oil separator. FIG. 2 is a perspective view of an area E in FIG. 1, enlarged and partially exploded. FIG. 3 is a cross-sectional view showing the oil separator.

In FIG. 1 to FIG. 3, the oil separator 10 has a case 11. The case 11 includes, a cylindrical case body 11a, an upper lid 11b that covers an upper surface of the case body 11a, a lower lid 11c that covers a lower surface of the case body 11a, and a leg part 11d that is fixed to the lower lid 11c. The upper lid 11b (upper end part of the case 11) is provided with an outlet 13 that is connected from the inside of the case body 11a, and the lower lid 11b (lower end part of the case 11) is provided with an inlet 12 that is connected into the case body 11a.

The inside of the case body 11a is filled with an adsorption member 30 (oil removal member: polypropylene fiber for example), which absorbs oil in the passing compressed air to separate and remove oil from said compressed air. The oil separator 10 is connected to a compressed air circuit (not shown), so that the compressed air flown from the inlet 12 in the lower end part to the case body 11a is passed through the adsorption member 30 and flown out from the outlet 13 in the upper end part.

The oil separator 10 has an oil detector 20 that provides instructions in accordance with an amount of oil included in the compressed air passing through the adsorption member 30. The oil detector 20 is constituted such that a pipe 22, a holding member 25, and a detection pipe 21 are connected to extend in series in the vertical direction (height direction). The tip of the pipe 22 is located between the inlet 12 and the outlet 13 in the height direction of the case 11, that is, at a predetermined position in the height direction in the adsorption member 30 filling the case body 11a.

Figure 4:
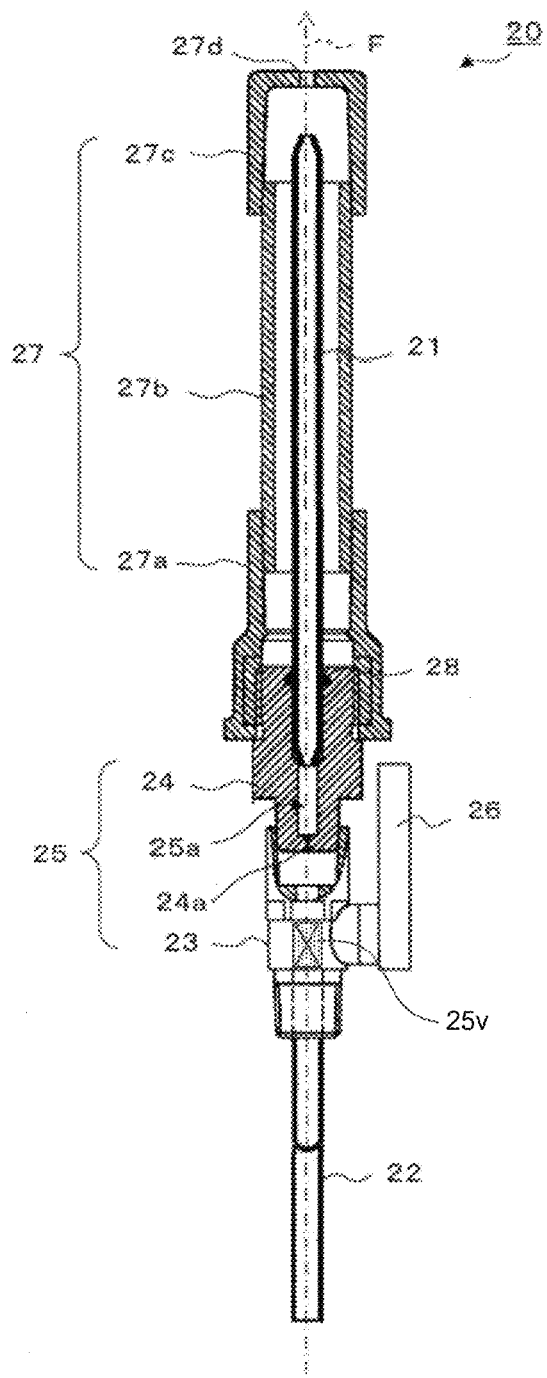
FIG. 4 is a cross-sectional view showing an oil detector that is used in an oil separator.

Furthermore, referring to FIG. 4 along with FIG. 2 and FIG. 3, the holding member 25 of the oil detector 20 includes: a detection pipe holder 24 detachably holding one end of a detection pipe 21; and a coupling block 23 fixed to an upper lid 11b of the case 11. The coupling block 23 couples the detection pipe holder 24 and the pipe 22 that extends inside the case body 11a (adsorption member 30). In the holding member 25 consisting of the coupling block 23 and the detection pipe holder 24, a channel 25a extending throughout them is formed. The channel 25a communicates with the pipe 22, and introduces the compressed air passing through the pipe 22 into the detection pipe 21 held by the detection pipe holder 24. A narrow channel 24a for introducing an appropriate amount of the compressed air into the detection pipe 21 is included in a part of the channel 25a which is formed in the detection pipe holder 24. An O-ring 28 for keeping airtightness is provided in a part of the detection pipe holder 24 that helds one end of the detection pipe 21.

A valve mechanism 25v for opening or closing the channel 25a is provided in the coupling block 23 of the holding member 25. The valve mechanism 25v performs opening or closing of the channel 25a in accordance with an operation of a lever 26. The oil detector 20 further includes a detection pipe cover 27 that covers the detection pipe 21 held by the detection pipe holder 24 in the state where the detection pipe 21 can be seen from the outside. The detection pipe cover 27 is constituted such that a connection part 27a detachably coupling with the detection pipe holder 24; a tube body 27b formed of transparent materials (glass, resin, etc.); a cap 27c an end surface of which is formed with a through hole 27d; are coupled in series in the respective longitudinal directions.

Figure 5:
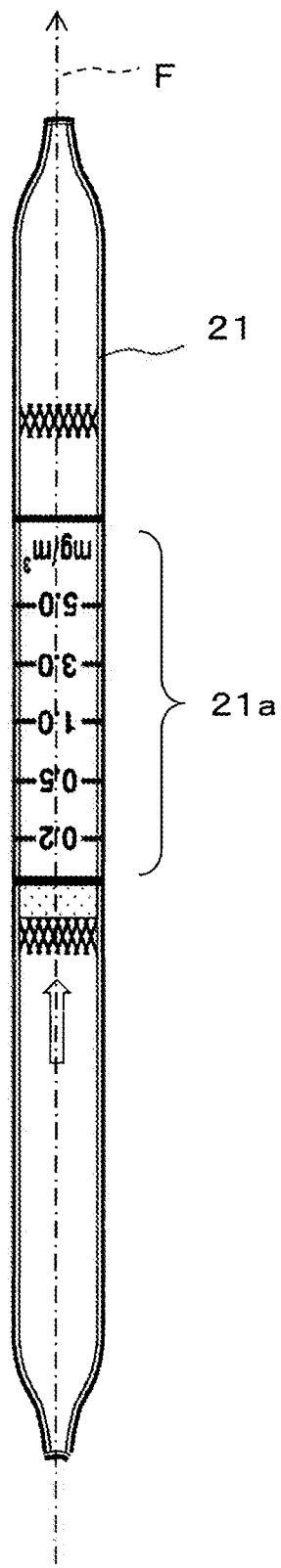
FIG. 5 is a front view showing a detection pipe that is used in the oil detector.

The elongated-shaped detection pipe 21 has an appearance as shown in FIG. 5, and provides instructions in accordance with the amount of the oil included in the compressed air passing through the pipe. As the dedetection pipe 21 for example, "No. 109AD" manufactured by Airtech can be used. In FIG. 5, a peripheral surface of the detection pipe 21 has a scale 21a (numerical value) that indicates the amount of the oil (0.2, 0.5, 1.0, 3.0, 5.0 mg/m$^3$) in the compressed air passing through inside of the detection pipe 21. The detection pipe 21 includes a reagent discolored by the oil included in the compressed air passing therethrough. The numerical value of the scale 21a corresponding to a boundary between different colors caused by discoloration indicates (represents) the amount of the oil included in the compressed air. As the amount of the oil included in the passing compressed air increases, a discolored area extends to a downstream side of a flow F of the compressed air, and the boundary between different colors corresponds to a greater value (indicating a larger amount of oil) of the scale 21a.

The oil separator 10 having the above mentioned structure is generally in the state where the channel 25a of the holding member 25 (coupling block 23, detection pipe holder 24) is closed by the lever 26. In this state, the compressed air flowing through the compressed air circuit to flow in the case body 11a from the inlet 12 passes through the adsorption member 30 to flow out from the outlet 13. When the compressed air passes through the adsorption member 30, oil components in said compressed air is absorbed to be removed by the adsorption member 30. As a result, clean compressed air, from which oil components are removed, flows in the compressed air circuit from the outlet 13.

When determining oil adsorption performance (oil removal performance) of the adsorption member 30, the channel 25a of the holding member 25 (coupling block 23, detection pipe holder 24) is opened by the lever 26. In this state, the compressed air flowing in the case body 11a from the inlet 12 passes through the adsorption member 30 to flow out from the outlet 13, and part of the compressed air passing through the adsorption member 30 is introduced in the oil detector 20. Specifically, part of the compressed air passing through the adsorption member 30 is introduced in the pipe 22, and the compressed air introduced in the pipe 22 passes through the channel 25a of the holding member 25 (coupling block 23, detection pipe holder 24) to be introduced in the detection pipe 21 held by the holding member 25 (detection pipe holder 24). Then, the flow F of the compressed air passing through the detection pipe 21 and escaping from the through hole 27d of the detection pipe cover 27 (cap 27) is formed (see FIG. 4 and FIG. 5).

A state where the flow F of the compressed air passing through the detection pipe 21 and escaping from the through hole 27d of the detection pipe cover 27 is formed in this way, is continued for a predetermined time (about 20 to 40 minutes, for example). Then, in the detection pipe 21, an area of a length corresponding to the amount of oil included in the compressed air passing through said detection pipe 21, that is, the amount of oil in the compressed air passing through the adsorption member 30, is discolored. The numerical value of the scale 21a corresponding to the boundary between the different colors caused by discoloration in the detection pipe 21 is shown to represent the amount of the oil included in the compressed air passing through the adsorption member 30. A user of the oil separator 10 can visually recognize the numerical value of the scale 21a corresponding to the boundary between different colors in the detection pipe 21 via the peripheral surface of the tube body 27b of the detection pipe cover 27.

The user of the oil separator 10 can determine the adsorption performance (oil removal performance) of the adsorption member 30 on the basis of the numerical value of the scale 21a corresponding to the boundary between different colors in the detection pipe 21. When the numerical value is small, that is, when the amount of the oil included in the compressed air passing through the adsorption member 30 is small, it can be determined that the adsorption member 30 appropriately removes the oil and a degree of reduction in adsorption performance (oil removal performance) of the adsorption member 30 is small (or the adsorption performance is not deteriorated). On the other hand, when the numerical value is large, that is, when the amount of the oil included in the compressed air passing through the adsorption member 30 is large, it can be determined that the adsorption member 30 does not appropriately remove the oil and a degree of reduction in adsorption performance (oil removal performance) of the adsorption member 30 is large.

When the numerical value of the scale 21a indicated by the detection pipe 21 exceeds a predetermined value (when the adsorption performance of the adsorption member 30 deteriorates beyond the limit), the detection pipe cover 27 can be removed from the detection pipe holder 24 to expose the detection pipe 21 and the detection pipe 21 held by the detection pipe holder 24 can be exchanged.

According to the oil separator 10 described above, the adsorption performance (oil removal performance) of the adsorption member 30 (oil removal member) can be determined in accordance with the numerical value of the scale 21a indicated by the detection pipe 21, the adsorption member 30 thus can be replaced at a suitable timing.

The tip of the pipe 22 of the oil detector 20 is located between the inlet 12 provided at the lower end part and the outlet 13 provided at the upper end part in the height direction (vertical direction) of the case 11, that is, located at a predetermined position in the height direction (vertical direction) in the adsorption member 30 in the case 11. Therefore, the adsorption performance of the adsorption member 30 can generally be determined on the basis of the amount of the oil included in the compressed air passing through the adsorption member 30 before the oil infiltrates into the upper end of the adsorption member 30, from the lower end of which the oil infiltrates. Thus, replacement time of the adsorption member 30 can be determined at a relatively early timing.

It should be noted that the positions of the inlet 12 and the outlet 13 are not limited to those described above (see FIG. 1 and FIG. 3), the outlet 13 may be located above the inlet 12 in the height direction of the case 11. In this case, the tip of the pipe 22 is located between the inlet 12 and the outlet 13 in the height direction of the case 10.

The structure of the oil detector 20 is not limited to the one that is described above (see FIG. 2 to FIG. 4). The oil detector 20 may at least consist of the pipe 22, the detection pipe 21, and the holding member 25. The holding member 25 is not limited to the one that has the structure including the coupling block 23 and the detection pipe holder 24, the holding member 25 may have the structure where the channel 25a is formed, the pipe 22 and the channel 25a are fixed to the case 11 (upper lid 11b) such that the pipe 22 and the channel 25a are communicated with each other, and the holding member 25 detacheably holds the detection pipe 21 such that the compressed air passing through the pipe 22 and channel 25a is introduced from the adsorption member 30 to the detection pipe 21.

The adsorption member 30 is used as the oil removal member, however, the oil removal member is not limited thereto. The oil removal member may be the one that can separate and remove oil from the compressed air.

The embodiments of the present invention have been described so far, however, they are presented as an example and not intended to restrict the scope of the invention. These novel embodiments described above can be implemented in various other forms, and various omission, substitution, and modification can be employed without departing from the scope of the invention.

INDUSTRIAL APPLICABILITY

The present invention has an effect that makes it possible to replace an oil removal member at a suitable timing and is useful as an oil separator to separate and remove oil from compressed air.

REFERENCE SIGNS LIST 10 oil separator
11 case
11a case body
11b upper lid
11c lower lid
11d leg part
12 inlet
13 outlet
20 oil detector
21 detection pipe
21a indication part
22 pipe
23 coupling block
24 detection pipe holder
24a orifice
25 holding member
25b channel
26 lever
27 detection pipe cover
27a connection part
27b tube body
27c cap
27d through hole
28 O-ring
30 adsorption member (oil removal member)

The invention claimed is:

1. An oil separator comprising:
a case having an inlet and outlet wherein the case has a shape extending in a height direction and the inlet is provided at a lower end part of the case and the outlet is provided at an upper end part of the case which is above the inlet in the height direction; and
an oil removal member, which is installed in the case, and separates and removes oil from compressed air that passes through the case;
the oil separator being configured such that the compressed air flowing from the inlet into the case passes through the oil removal member and flows out from the outlet, wherein
the oil separator further comprising:
a pipe extending in such a way that a tip of the pipe is located inside the oil removal member in the case;
an elongated-shaped detection pipe that is configured to display an indicator of the quantity of the oil included in the compressed air, and that is placed outside the case; and
a holding member which is formed with a channel, fixed to the case such that the pipe and channel are communicated with each other, and detachably holds said detection pipe such that the compressed air passing through the pipe and channel is introduced from the oil removal member to the detection pipe, wherein
the holding member comprises a valve mechanism to perform opening or closing the channel so that
when the valve mechanism is closed, the compressed air flows from the inlet to the outlet to be discharged outside the case wherein the flow is defined as a main flow, and when the valve mechanism is opened, the compressed air flows through the pipe and the detection pipe in addition to the main flow to be discharged outside the case wherein the flow flowing through the pipe and the detection pipe is defined as a sub flow,
a tip of the pipe is provided with an opening for intaking the compressed air, and the opening faces the lower side part, and
the opening of the pipe is positioned in an upper half of the case.

2. The oil separator according to claim 1, wherein
the holding member comprises: a detection pipe holder detachably holding one end of the detection pipe; and
a coupling block that couples the detection pipe holder and the pipe.

3. The oil separator according to claim 1, wherein
the holding member comprises: a detection pipe holder detachably holding one end of the detection pipe; and
a coupling block that couples the detection pipe holder and the pipe.

4. The oil separator according to claim 2, comprising
a detection pipe cover, detachably connected to the detection pipe holder at one end portion, and formed with a through hole in another end portion, the detection pipe cover covering the detection pipe in the state where the detection pipe can be seen from the outside.

5. The oil separator according to claim 3, comprising
a detection pipe cover, detachably connected to the detection pipe holder at one end portion, and formed with a through hole in another end portion, the detection pipe cover covering the detection pipe in the state where the detection pipe can be seen from the outside.

6. The oil separator according to claim 1, wherein
the detection pipe contains a reagent that reacts irreversibly with oil, and as the quantity of the oil contained in the compressed air increases, the reagent reacts more to form the indicator.

7. An oil separator comprising:
a case having an inlet and outlet wherein the case has a shape extending in a height direction and the inlet is provided at a lower end part of the case and the outlet is provided at an upper end part of the case which is above the inlet in the height direction; and
an oil removal member, which is installed in the case, and separates and removes oil from compressed air that passes through the case;
the oil separator being configured such that the compressed air flowing from the inlet into the case passes through the oil removal member and flows out from the outlet, wherein the oil separator further comprising:

a pipe extending in such a way that a tip of the pipe is located inside the oil removal member in the case;

an elongated-shaped detection pipe that is configured to display an indicator of the quantity of the oil included in the compressed air, and that is placed outside the case; and a holding member which is formed with a channel, fixed to the case such that the pipe and channel are communicated with each other, and detachably holds said detection pipe such that the compressed air passing through the pipe and channel is introduced from the oil removal member to the detection pipe, wherein the holding member comprises a valve mechanism to perform opening or closing the channel so that when the valve mechanism is closed, the compressed air flows from the inlet to the outlet to be discharged outside the case wherein the flow is defined as a main flow, and when the valve mechanism is opened, the compressed air flows through the pipe and the detection pipe in addition to the main flow to be discharged outside the case wherein the flow flowing through the pipe and the detection pipe is defined as a sub flow, a tip of the pipe is provided with an opening for intaking the compressed air, and the opening faces the lower side part, the opening of the pipe is positioned in an upper half of the case, and the tip of the pipe, the channel, and the detection pipe are arranged in the height direction so that internal passes of the pipe, the channel, and the detection pipe form the sub flow aligned straight.

8. The oil separator according to claim 7, wherein an internal diameter of the pipe and an internal diameter of the opening are the same, both of which being smaller than an internal diameter of the outlet.

9. An oil separator comprising:

a case having an inlet and outlet wherein the case has a shape extending in a height direction and the inlet is provided at a lower end part of the case and the outlet is provided at an upper end part of the case which is above the inlet in the height direction; and an oil removal member, which is installed in the case, and separates and removes oil from compressed air that passes through the case;

the oil separator being configured such that the compressed air flowing from the inlet into the case passes through the oil removal member and flows out from the outlet, wherein the oil separator further comprising:

a pipe extending in such a way that a tip of the pipe is located inside the oil removal member in the case;

an elongated-shaped detection pipe that is configured to display an indicator of the quantity of the oil included in the compressed air, and that is placed outside the case; and a holding member which is formed with a channel, fixed to the case such that the pipe and channel are communicated with each other, and detachably holds said detection pipe such that the compressed air passing through the pipe and channel is introduced from the oil removal member to the detection pipe, wherein the holding member comprises a valve mechanism to perform opening or closing the channel so that when the valve mechanism is closed, the compressed air flows from the inlet to the outlet to be discharged outside the case wherein the flow is defined as a main flow, and when the valve mechanism is opened, the compressed air flows through the pipe and the detection pipe in addition to the main flow to be discharged outside the case wherein the flow flowing through the pipe and the detection pipe is defined as a sub flow, a tip of the pipe is provided with an opening for intaking the compressed air, and the opening faces the lower side part, the opening of the pipe is positioned in an upper half of the case, and the tip of the pipe, the channel, and the detection pipe are arranged in the height direction so that internal passes of the pipe, the channel, and the detection pipe form the sub flow parallel to the main flow.

* * * * *